United States Patent [19]  [11] 4,267,275
Müller  [45] May 12, 1981

[54] METHOD OF RECOVERING PRODUCTS OF HIGH PROTEIN CONTENT FROM PROTEIN-POLYSACCHARIDE COMPLEXES

[75] Inventor: Hans Müller, Im Allmendli, 8703 Erlenbach, Switzerland

[73] Assignee: Dr. Ing Hans Müller, Mannedorf, Switzerland

[21] Appl. No.: 952,265

[22] Filed: Oct. 18, 1978

Related U.S. Application Data

[63] Continuation of Ser. No. 704,914, Jul. 13, 1976, abandoned.

[30] Foreign Application Priority Data

Jul. 28, 1975 [CH] Switzerland .......................... 9908/75
Feb. 12, 1976 [CH] Switzerland .......................... 1828/76

[51] Int. Cl.$^3$ ............................ C07G 7/00; A23J 3/00
[52] U.S. Cl. ..................................... 435/272; 426/52; 426/800; 426/801; 260/112 G
[58] Field of Search ....................... 426/44, 49, 52, 656, 426/800, 801; 260/112 R, 112 G; 195/4, 7, 11; 435/272

[56] References Cited

U.S. PATENT DOCUMENTS 3,782,964  1/1974  Knight ..................................... 195/4

OTHER PUBLICATIONS

Rose "Condensed Chemical Dictionary" van Nostrand Reinhold Pulishers, 1970, p. 452.
Michaels "New Separation Technique for CPI", Chemical Engineering Progress, vol. 64, No. 12 (1968) pp. 31–43.
Inglett "Symposium Seed Protein", Avi Publishing Company, 1972, pp. 193–211.
Hlynka "Wheat Chemistry and Technology", American Association of Cereal Chemists, 1964, pp. 232–243 & 254–259.

*Primary Examiner*—R. B. Penland
*Attorney, Agent, or Firm*—Michael J. Striker

[57] ABSTRACT

A method of recovering water-insoluble and water-soluble protein fractions from protein-polysaccharide complexes such as wheat gluten involves subjecting a complex of this type to an enzyme treatment in the presence of a liquid so as to decompose at least a portion of the polysaccharide content of the complex and dissolve at least a portion of the protein content of the complex thereby obtaining a suspension of protein solids in the solution formed by the liquid. The liquid used is preferably water. The suspension is separated into a solids fraction and a liquid fraction by centrifugation of filtration. The solids fraction and liquid fraction are then treated separately from one another to thereby obtain a water-insoluble protein fraction and a water-soluble protein fraction. The treatment of the solids fraction may involve washing of the same followed by drying. The treatment of the liquid fraction may involve desalination, subsequent concentration by evaporation and drying of the concentrate obtained by virtue of the evaporation.

2 Claims, No Drawings

METHOD OF RECOVERING PRODUCTS OF HIGH PROTEIN CONTENT FROM PROTEIN-POLYSACCHARIDE COMPLEXES

This is a continuation of application Ser. No. 704,914, filed July 13, 1976 now abandoned.

BACKGROUND OF THE INVENTION

The invention relates generally to the treatment of protein-polysaccharide complexes. Of special interest to the invention is a method of producing products of high protein content from wheat flour and, even more particularly, from wheat gluten.

Wheat possesses a higher percentage of protein than any other type of grain. Thus, wheat as such contains about 12.0 percent by weight of crude protein. On the other hand, wheat flour contains about 14 percent by weight of protein substances on the average. These protein substances consist predominantly of gluten. The latter is an elastic, rubber-like protein substance which forms an inherent part of the wheat. The characteristic consistency of the gluten after mixing with water determines the baking properties of the wheat flour.

The gluten is obtained from the wheat flour by washing out the latter with water. During this operation, the starch present in the wheat flour is removed in the form of a starch emulsion and the gluten remains behind as an elastic mass. The starch present in the wheat and recovered by washing out of the wheat flour is frequently accorded no more significance than merely a side product obtained during recovery of the gluten.

The gluten contains both water-soluble and water-insoluble proteins, that is, the protein content of the gluten is partially water-soluble. Of the proteins present in the gluten, the water-soluble proteins represent a desired product in the food and pharmaceutical industries. Thus, the water-soluble proteins are particularly easy to digest and may be incorporated into foods in spray-dried or freeze-dried form. Advantageously, the water-soluble proteins are used in baby foods, for dietetic purposes and for geriatric purposes.

Certain problems arise in the prior art. On the one hand, the gluten produced according to the known procedures contains a maximum of 60 percent by weight of crude protein. It is not possible to achieve a higher protein concentration by washing out the wheat flour with water in accordance with the conventional methods. On the other hand, it is not possible to readily recover the water-soluble proteins present in the gluten in the form of a product having a high concentration of protein.

SUMMARY OF THE INVENTION

It is an object of the invention to provide a method of treating protein-polysaccharide complexes which enables products of high protein content to be recovered.

Another object of the invention is to provide a method which enables the protein content of protein-polysaccharide complexes, particularly those obtained from wheat, to be separated into water-soluble and water-insoluble fractions containing high percentages of protein.

These objects, as well as others which will become apparent hereinafter, are achieved in accordance with the invention. One aspect of the invention relates to a method of recovering water-soluble and water-insoluble protein fractions from protein-polysaccharide complexes which involves subjecting a protein-polysaccharide complex, e.g., gluten, to an enzyme treatment in the presence of a liquid, e.g., water, so as to decompose at least a portion of the polysaccharide, e.g., starch, content of the complex and dissolve at least a portion of the protein content of the complex. This yields a suspension of solids in the solution formed by the liquid. The suspension is separated into a solids fraction and a liquid fraction. The solids fraction and the liquid fraction are treated separately from one another to thereby obtain a water-insoluble protein fraction and a water-soluble protein fraction.

DESCRIPTION OF THE PREFERRED EMBODIMENTS

As indicated previously, the invention is especially concerned with a method for the production of products containing high percentages of protein from wheat flour and, even more particularly, from wheat gluten. Hence, for the sake of illustration, the description herein will be primarily with reference to wheat gluten. It has now been found that it is possible to obtain a water-soluble protein substance of high protein content from wheat gluten in a simple manner after the major part of the carbohydrates bound to the gluten have been removed therefrom by means of starch-destroying enzymes. Advantageously, alpha-amylase is used as a starch-destroying enzyme.

According to the invention, wheat gluten is subjected to an enzyme treatment in the presence of a liquid in order to at least partially decompose the starch present in the gluten. At least part of the protein content of the gluten goes into solution in the liquid so that, at the end of the enzyme treatment, there is obtained a suspension of solids in the solution formed by the liquid. The suspension is separated into a solids fraction and a liquid fraction. The solids fraction and the liquid fraction are then treated separately from one another so as to obtain a water-insoluble protein fraction as well as a water-soluble protein fraction.

The enzyme treatment is preferably carried out in the presence of water so that an aqueous solution and aqueous suspension are obtained.

The operation of separating the suspension into a solids fraction and a liquid fraction favorably involes centrifugation or filtration of the suspension.

The treatment of the solids fraction obtained by separation of the suspension into a solids fraction and a liquid fraction may involve washing the solids fraction one or more times and thereafter drying the solids fraction.

On the other hand, the treatment of the liquid fraction obtained by separation of the suspension into a solids fraction and a liquid fraction may involve subjecting the liquid fraction to evaporation so as to obtain a concentrate and thereafter drying the concentrate.

The drying of the solids fraction and/or of the concentrate obtained from the liquid fraction may involve spray-drying or freeze-drying.

It may be necessary to add salts such as calcium salts to the gluten during the enzyme treatment. These salts will, at least to some extent, be present in the solution formed during the enzyme treatment. In accordance with the invention, the supernatant or filtrate obtained by centrifugation or filtration of the suspension produced during the enzyme treatment, that is, the liquid fraction obtained by separation of the suspension into a solids fraction and a liquid fraction, may be desalinated by ion-exchange so as to remove the salts added during the enzyme treatment.

A particularly advantageous aspect of the invention resides in a method of separating a protein substance of high protein content which latter is derived from wheat gluten which has been subjected to an enzyme treatment in the presence of water, into a water-soluble and a water-insoluble fraction. The method is characterized, and the objects of the invention are achieved, in that the aqueous suspension obtained after the enzyme treatment is centrifuged or filtered and the concentrate, that is, solids fraction, and supernatent or filtrate, that is, liquid fraction, are worked up separately.

The following is exemplary of the procedures used in carrying out a method according to the invention and is intended to provide a better understanding of the method of the invention:

100 grams of wheat gluten in powder form is stirred into 750 milliliters of tap water. The water already contained 1.1 grams of $CaCl_2.H_2O$ in dissolved form. The gluten suspension is stirred for a period of ½ hour to 1 hour. After stirring of the gluten suspension for ½ hour to 1 hour, 50 to 250 milligrams of Amylase HT 1000 (manufactured by Miles Laboratories) are added. The resulting enzymatic suspension is heated to a temperature of 70° C. while stirring. The enzymatic suspension is held at the temperature of 70° C. for a period of ½ hour to 2 hours. After the holding time at 70° C., the enzymatic suspension is cooled. Subsequent to cooling of the enzymatic suspension, the liquid portion thereof, which is in the form of a solution, is separated from the solids portion or residue of the enzymatic suspension by centrifuging at 2600 grams. The centrifugation is carried out for a period of 10 to 20 minutes. Thereafter, the residue is washed twice with 750 milliliters of water and again subjected to centrifugation. The residue is then dried at a temperature of 105° C. until a condition of constant or unvarying weight is achieved.

The supernatant derived from centrifugation of of the enzymatic suspension, that is, the liquid portion of the enzymatic suspension, is combined with the wash water used for washing of the residue and the mixture thus obtained is placed in a rotational evaporator. The body of liquid in the evaporator is subjected to evaporation under vacuum and at temperatures of 40° to 50° C. Evaporation is continued until a state of dryness is achieved.

There is thus obtained a water-soluble protein fraction and a water-insoluble protein fraction. The protein contents of the two protein fractions derived from the wheat gluten are calculated via a determination of the nitrogen contents. The nitrogen contents are determined according to the Kjeldahl method. A multiplication factor of 6.25 is selected for the calculations of the protein contents. The protein fractions derived from the wheat gluten contained the following percentages of protein when specified conditions within the ranges outlined above were used:

Water-soluble protein fraction: 77.5 percent by weight of protein relative to the total water soluble fraction Water-insoluble protein fraction (residue or concentrate fraction): 92.3 percent by weight of protein relative to the water insoluble fraction The yield as based on the original wheat gluten amounts to 29.5 percent by weight of soluble protein and 43.7 percent by weight of insoluble protein, that is, 73.2 percent by weight of protein as based on the original wheat gluten, when the same specified conditions as those for which the percentages of protein in the water-soluble and water-insoluble fractions were calculated are used.

Instead of using a centrifuge to separate the water-soluble and water-insoluble protein fractions from one another as in the foregoing exemplary illustration, a suitable filter may be used for this purpose.

It is to be understood that the preceding exemplary illustration is not intended to impose any limitation on the method of the invention but is intended only to provide a better understanding of the invention.

It will be appreciated that other protein-polysaccharide complexes such as, for example, yeast, may be treated in the same manner as described in the foregoing exemplary illustration. By proceeding in such a manner, the cell walls of the yeast will be decomposed and soluble protein may be recovered in an analogous way.

By virtue of the method according to the invention, an enrichment of the wheat gluten and other protein-polysaccharide complexes occurs and a higher grade product in the form of a protein substance having a high percentage of protein is produced.

It has been found to be particularly advantageous to use an ultrafilter subsequent to the treatment with the polysaccharide- or starch-destroying enzymes, that is, to subject the suspension derived from the enzyme treatment to ultrafiltration. The ultrafiltration may be carried out with any of the ultrafilters available on the market. During the ultrafiltration, the dissolved sugar is removed from the suspension. Favorably, water is added to an aqueous suspension during ultrafiltration.

By means of ultrafiltration, it becomes possible to increase the total concentration of protein, that is, the concentration of soluble and insoluble protein, to a value of about 80 percent by weight. However, the original property of gluten which, prior to the treatment in accordance with the invention, makes it outstanding as an addition during the production of bread for the purpose of improving the baking characteristics, will be lost here.

Nevertheless, the new property obtained subsequent to the enzyme treatment has been found to be advantageous in certain applications, for instance, in the manufacture of biscuits and cookies. Thus, contrary to what is desired for bread, a crumbling quality is desirable for biscuits and cookies, that is, it is desirable for biscuits and cookies to be capable of being broken at closely spaced locations, and this is possible to achieve only in the absence of true gluten.

The protein-containing product recovered by ultrafiltration may be spray-dried and yields a high-grade protein substance which is suitable for incorporation in foods intended for human consumption, particularly baby foods, foods for dietetic purposes and foods for geriatric purposes.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of recovering both a water-soluble and a water-insoluble protein fraction from a protein-polysaccharide complex, said method consisting essentially of subjecting wheat gluten to a treatment with a starch degrading enzyme in the presence of water at a temperature of about 75° C. for a period of about ½ to 2 hours so as to decompose at least a portion of the polysaccharide content of said gluten and dissolve at least a portion of the protein content of said gluten, thereby obtaining an aqueous suspension of solids, thereafter separating said suspension by filtration or centrifuging into (a) a solids fraction which after drying results in a first protein fraction and (b) a liquid fraction which after concentration and drying constitutes a second protein fraction, and recovering and combining both of these fractions so as to obtain a total concentration of protein substantially above 60% in the form of a high protein product obtained both from the water insoluble and the water-soluble protein fraction.

2. The method of claim 1 wherein said treatment of said solids fraction comprises washing the latter with water at least once prior to drying at about 105° C. and combining the liquid filtrate with said wash water and effecting said concentration and drying of the combined liquids by evaporation at about 40° to 50° C.

* * * * *